US008277593B2

(12) United States Patent
Kim et al.

(10) Patent No.: US 8,277,593 B2

(45) Date of Patent: Oct. 2, 2012

(54) PRINTING PLATE AND METHOD OF FABRICATING LIQUID CRYSTAL DISPLAY DEVICE USING THE SAME

(75) Inventors: Chul Ho Kim, Paju-si (KR); Tae Young Oh, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 665 days.

(21) Appl. No.: 11/453,081

(22) Filed: Jun. 15, 2006

(65) Prior Publication Data

US 2007/0062395 A1 Mar. 22, 2007

(30) Foreign Application Priority Data

Sep. 12, 2005 (KR) ........................ 10-2005-0084791

(51) Int. Cl.
*B32B 38/14* (2006.01)
*B05D 1/28* (2006.01)

(52) U.S. Cl. ........ 156/232; 156/235; 156/277; 427/108; 427/256; 427/277; 427/428.01

(58) Field of Classification Search .................. 156/232, 156/235, 277; 101/217, 492; 427/108, 256, 427/277, 428.01; 349/106
See application file for complete search history.

(56) References Cited

U.S. PATENT DOCUMENTS

| | | | | | |
|---|---|---|---|---|---|
| 3,593,661 | A * | 7/1971 | Tripp | ........................... | 101/175 |
| 5,996,488 | A * | 12/1999 | Yanagisawa et al. | ......... | 101/170 |
| 6,099,993 | A * | 8/2000 | Kim et al. | ......................... | 430/7 |
| 7,153,618 | B2 * | 12/2006 | Kim et al. | ......................... | 430/7 |

FOREIGN PATENT DOCUMENTS

| | | | |
|---|---|---|---|
| JP | 11198337 | A * | 7/1999 |
| KR | 10-1996-0019376 | A | 6/1996 |
| KR | 20040077111 | A * | 9/2004 |

* cited by examiner

*Primary Examiner* — Michael Tolin

(74) *Attorney, Agent, or Firm* — McKenna Long & Aldridge, LLP

(57) ABSTRACT

A printing plate and a method of fabricating an LCD device are disclosed. The printing plate includes convex and concave portions, and a blanket support formed in the concave portion to prevent the bottom of the concave portion from being directly in contact with a pattern material coated on a blanket of a printing roll. The blanket support is additionally formed in the concave portion of the printing plate to prevent the pattern material coated on the blanket of the printing roll from being directly in contact with the bottom of the concave portion. In this case, the pattern material can be prevented from being transferred onto the printing plate in an undesired pattern. As a result, it is possible to form a precise pattern.

9 Claims, 7 Drawing Sheets

PRINTING PLATE AND METHOD OF FABRICATING LIQUID CRYSTAL DISPLAY DEVICE USING THE SAME

This application claims the benefit of Korean Patent Application No. P2005-84791, filed on Sep. 12, 2005, which is hereby incorporated by reference for all purposes as if fully set forth herein.

BACKGROUND OF THE INVENTION

1. Field of the Invention

The present invention relates to a method of fabricating a liquid crystal display (LCD) device, and more particularly, to a method for forming a pattern of an LCD device using a printing method.

2. Discussion of the Related Art

Among ultra thin flat panel display devices having a display screen several centimeters thick, LCD devices have been widely used for notebook computers, monitors, spaceships, aircraft, and so on due to their features and advantages of a low driving voltage, low power consumption, portability, and the like.

The LCD device includes a lower substrate, an upper substrate, and a liquid crystal layer formed between the substrates. Generally, a thin film transistor and a pixel electrode are formed on the lower substrate, and a light-shielding layer, a color filter layer and a common electrode are formed on the upper substrate.

The LCD device includes various elements, and a number of process steps are repeated to form the elements. Particularly, a photolithographic process has been used to pattern such various elements in various shapes.

However, because the photolithographic process requires a mask of a predetermined pattern and a light or radiation source, the fabricating cost increases correspondingly. Also, because the photolithographic process includes exposure and development processes, the process steps are complicated and the process time becomes long.

Under these circumstances, a new method for forming a pattern has been required to solve the drawbacks of the photolithographic process. As a result, a printing method has been suggested.

In the printing method, to form a desired pattern, a desired material is coated on a printing roll and then transferred onto a substrate by rotating the printing roll. Hereinafter, a related art printing method will be described in more detail with reference to the accompanying drawings.

FIGS. 1A to 1C are process views illustrating a related art printing method.

First, as shown in FIG. 1A, a pattern material 20 is coated on a printing roll 30 using a printing nozzle 10. In this case, because a blanket 35 is attached to the printing roll 30, the pattern material is coated on the blanket 35.

Then, as shown in FIG. 1B, the printing roll 30 is rotated on a printing plate 40 provided with a concave portion 43 and a convex portion 46. In this case, some pattern material 20*a* is transferred onto the convex portion 46 of the printing plate 40, and a predetermined pattern 20*b* is formed on the blanket 35 of the printing roll 30 by the remaining pattern material 20*b*.

Afterwards, as shown in FIG. 1C, the printing roll 30 is rotated on a substrate 50 to transfer the pattern 20*b* onto the substrate 50.

Because the aforementioned related art printing method does not need a photolithographic process such as exposure and development processes, the cost is reduced and the process steps are simplified. Therefore, the related art printing method is very suitable for mass production.

However, in the aforementioned related art printing method, the pattern material 20 coated on the blanket 35 of the printing roll 30 may be in contact with the concave portion 43 of the printing plate 40. In this case, a problem occurs in that a precise pattern is not formed.

Referring to FIG. 2, problems of the related art printing method will be described in more detail.

As shown in FIG. 2A, when the printing roll 30 whose blanket 35 is coated with the pattern material 20 is rotated on the printing plate 40 provided with the concave portion 43 and the convex portion 46, the pattern material 20 may be in contact with the concave portion 43 of the printing plate 40.

The pattern material 20 may be in contact with the concave portion 43 of the printing plate 40 by swelling of the blanket 35 attached to the printing roll 30. Alternatively, the pattern material 20 may be in contact with the concave portion 43 of the printing plate 40 when the concave portion of the printing plate 40 has a large size to form a large sized pattern.

If the pattern material 20 is in contact with the concave portion 43 of the printing plate 40 as shown in FIG. 2A, some pattern material 20*a* is transferred onto the convex portion 46 and at the same time some pattern material 20*b* is transferred onto the concave portion 43 as shown in FIG. 2B. For this reason, a pattern material 20*c* remaining on the blanket 35 of the printing roll 30 is not formed in the desired pattern, and no pattern material is formed in a region A. As a result, it is difficult to form a precise pattern.

In particular, if some pattern material 20*b* is transferred onto the concave portion 43 by contact, the pattern material in all directions as well as the pattern material in contact with the concave portion 43 is spaced apart from the blanket 35 and transferred onto the concave portion 43.

In other words, if the pattern material is in contact with the concave portion 43 of the printing plate 40, a problem occurs in that an undesired pattern material is transferred onto the concave portion 43. Another problem occurs in that a pattern material to be transferred onto the concave portion cannot be predicted at all.

SUMMARY OF THE INVENTION

Accordingly, the present invention is directed to a printing plate and a method of fabricating an LCD using the same that substantially obviate one or more problems due to limitations and disadvantages of the related art.

An advantage of the present invention is to provide a printing plate in which a pattern material transferred onto the printing plate is uniformly maintained to form a precise pattern.

Another advantage of the present invention is to provide a method of fabricating an LCD using a printing plate, in which a pattern material transferred onto the printing plate is uniformly maintained to form a precise pattern.

Additional features and advantages of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose: of the present invention, as embodied and broadly described herein, a printing plate according to the present invention includes convex and concave portions, and a blanket support formed in the concave portion to prevent the bottom of the concave portion from being directly in contact with a pattern material coated on a blanket of a printing roll.

In another aspect of the present invention, a method of fabricating an LCD device includes coating a pattern material on a blanket of a printing roll using a printing nozzle, transferring some pattern material onto a convex portion and a blanket support by rotating the printing roll on a printing plate provided with the convex portion, a concave portion, and the blanket support that is in the concave portion, and forming a predetermined pattern on a substrate by rotating the printing roll on the substrate and transferring a remaining pattern material onto the substrate.

The pattern material is a color filter material, and the predetermined pattern formed on the substrate is a color filter layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the preferred embodiments of the present invention, examples of which are illustrated in the accompanying drawings.

Wherever possible, the same reference numbers will be used throughout the drawings to refer to the same or like parts.

Figure 1A:
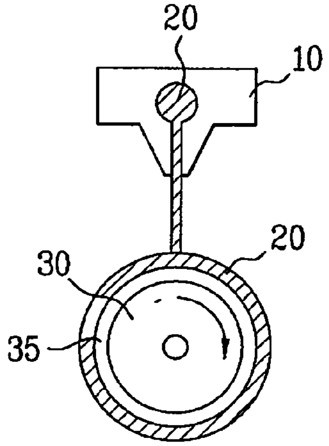
FIG. 1A Related Art
FIGS. 1A to 1C are process views illustrating a related art printing method.
Figure 1B:
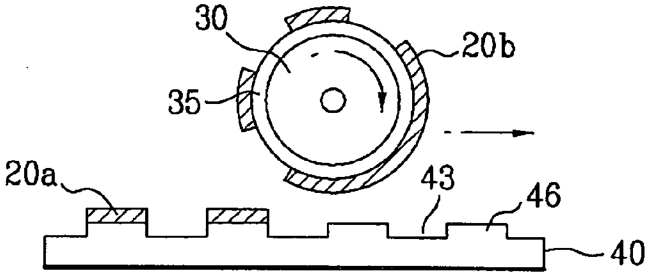
FIG. 1B Related Art
Figure 1C:
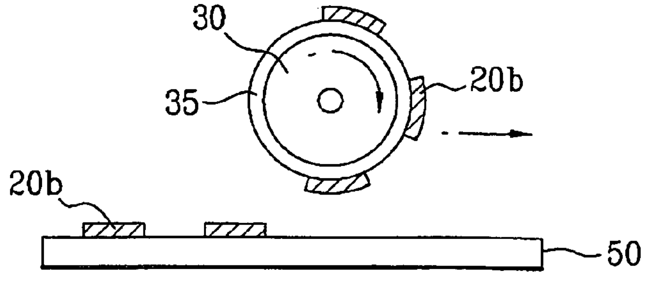
FIG. 1C Related Art
Figure 2A:
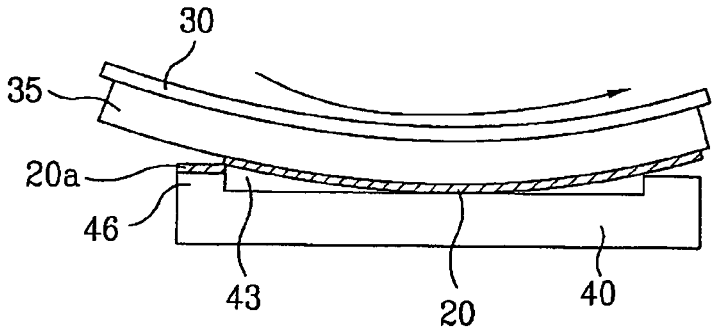
FIG. 2A Related Art
FIGS. 2A and 2B are sectional views illustrating problems of a related art printing method.
Figure 2B:
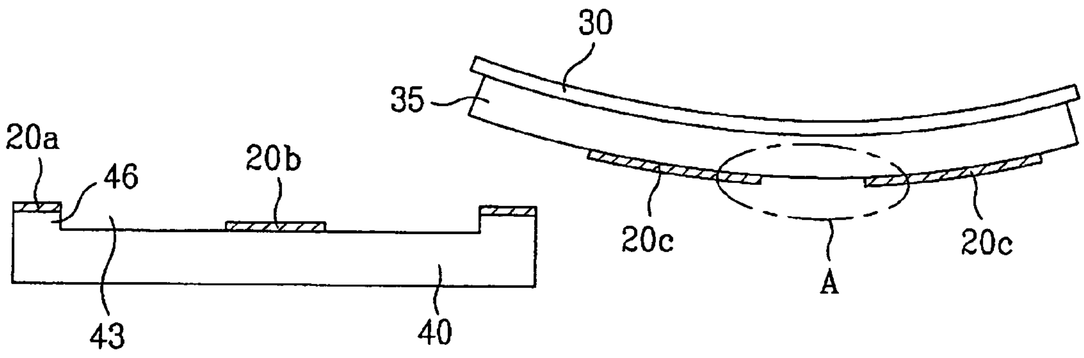
FIG. 2B Related Art
Figure 3A:
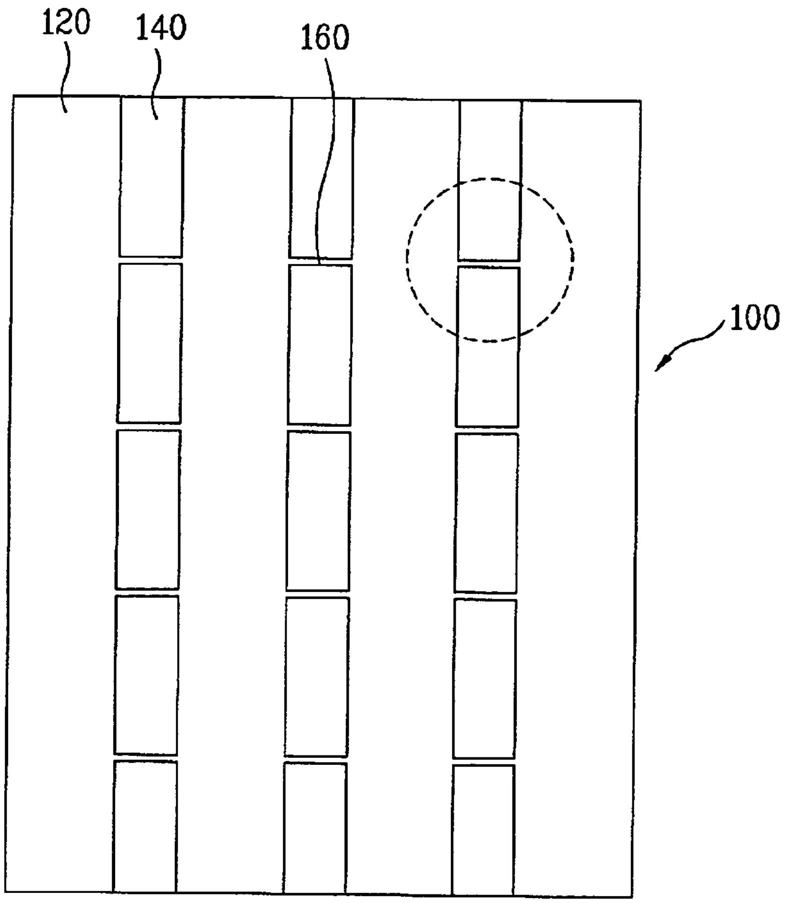
FIG. 3A is a plan view illustrating a printing plate according to the embodiment of the present invention.
Figure 3B:
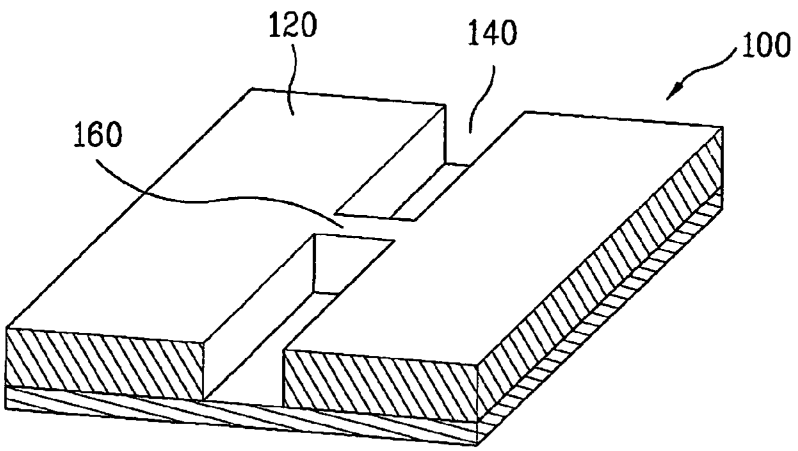
FIG. 3B is a perspective view illustrating a printing plate corresponding to a circle of FIG. 3A.

FIG. 3A is a plan view illustrating a printing plate according to the embodiment of the present invention, and FIG. 3B is a perspective view illustrating a printing plate corresponding to a circle of FIG. 3A.

As shown in FIGS. 3A and 3B, a printing plate 100 according to the embodiment of the present invention includes a convex portion 120 and a concave portion 140.

A blanket support 160 is formed in the concave portion 140.

The convex portion 120 corresponds to a portion where a pattern material coated on a blanket of a printing roll is transferred onto the printing plate 100.

The concave portion 140 corresponds to a portion where the pattern material coated on the blanket of the printing roll is not transferred onto the printing plate but remains to form a final pattern.

The blanket support 160 corresponds to a portion where the pattern material coated on the blanket of the printing roll is transferred onto the printing plate 100 similarly to the convex portion 120. The blanket support 160 serves to prevent the pattern material coated on the blanket of the printing roll from being directly in contact with the bottom of the concave portion 140, whereby the pattern material coated on the blanket of the printing roll is not transferred onto the concave portion 140. To this end, the blanket support 160 is formed to be higher than the bottom of the concave portion 140. Accordingly, the height of the blanket support 160 is equal to that of the convex portion 120 as shown in FIG. 3B. However, the height of the blanket support 160 is not limited to such case. In other words, the height of the blanket support 160 may be lower than that of the convex portion 120.

Also, the blanket support 160 may be formed in contact with the side of the convex portion 120 as shown in FIG. 3B. However, the blanket support 160 is not limited to such a structure. In other words, the blanket support 160 may not be formed in contact with the side of the convex portion 120.

A plurality of blanket supports 160 may be formed in the concave portion 140 as shown in FIG. 3A.

Meanwhile, if the pattern material is used as a color filter of an LCD device, the plurality of blanket supports 160 are preferably formed at intervals corresponding to the distance between cells of the LCD device. The reason why the blanket supports 160 are formed as above is as follows. The color filter material coated on the blanket of the printing roll is transferred onto the plurality of blanket supports 160, so that the color filter layer formed on a substrate is discontinuously patterned. In this case, because the discontinuous portion of the color filter layer corresponds to a light-shielding layer between cells, images may be displayed without any problem. This will be understood more clearly referring to a method of fabricating an LCD device that will be described later.

FIGS. 4A to 4E are process views illustrating a method of fabricating an LCD device according to the embodiment of the present invention. In more detail, process steps of fabricating an LCD device, which include a process step of forming a color filter layer pattern of the LCD device using the aforementioned printing plate, are shown in FIGS. 4A to 4E.

Figure 4A:
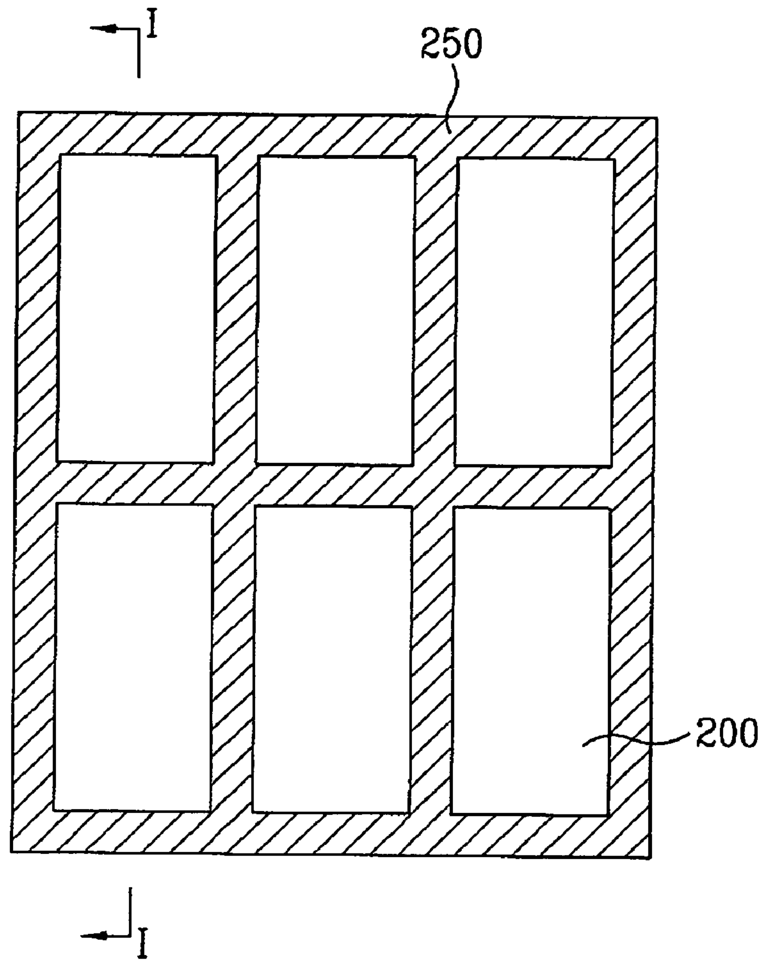
FIGS. 4A to 4E are process views illustrating a method of fabricating an LCD device according to the embodiment of the present invention.
Figure 4A:
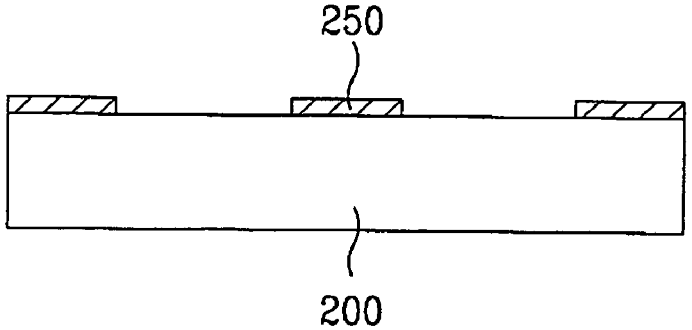

First, as shown in FIG. 4A, a light-shielding layer 250 is formed on a substrate 200.

An upper side of FIG. 4A is a plan view illustrating the light-shielding layer 250 formed on the substrate 200, and its lower side is a sectional view taken along line I-I of the upper side.

The light-shielding layer 250 is formed on the boundary between cells and sever to shield light leakage there.

A color filter layer is formed in regions where the light-shielding layer 250 is not formed by the process steps of FIGS. 4B to 4E that will be described later.

Figure 4B:
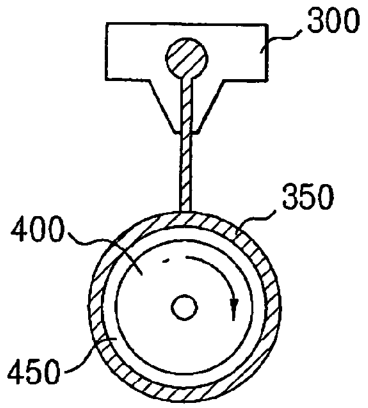

Afterwards, as shown in FIG. 4B, a color filter material 350 (for example, pigment material of red, green or blue) is coated on a blanket 450 of a printing roll 400 using a printing nozzle 300.

Figure 4C:
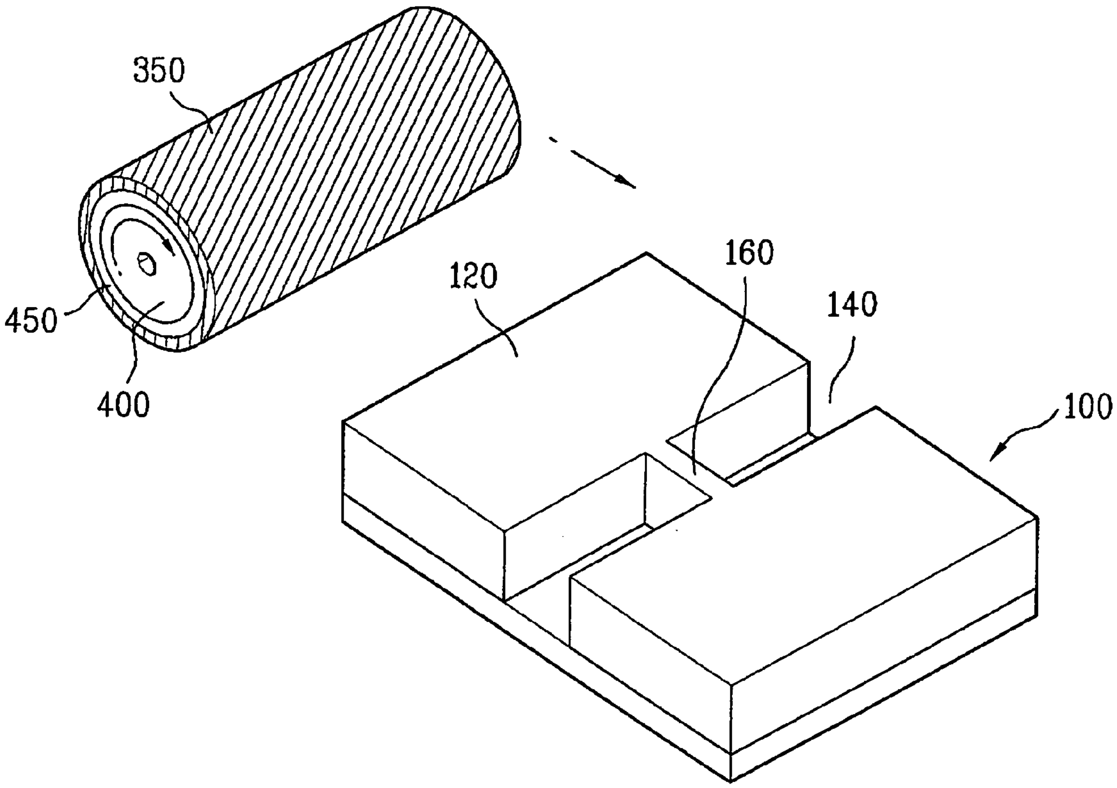

Then, as shown in FIG. 4C, the printing roll 400 coated with the color filter material 350 is rotated on a printing plate 100.

The printing plate 100 includes a convex portion 120 and a concave portion 140, wherein a blanket support 160 is formed in the concave portion 140. The printing plate 100 is the same as that of the aforementioned embodiment.

Particularly, a plurality of blanket supports 160 are preferably formed at intervals corresponding to the distance between cells between the LCD device.

Figure 4D:
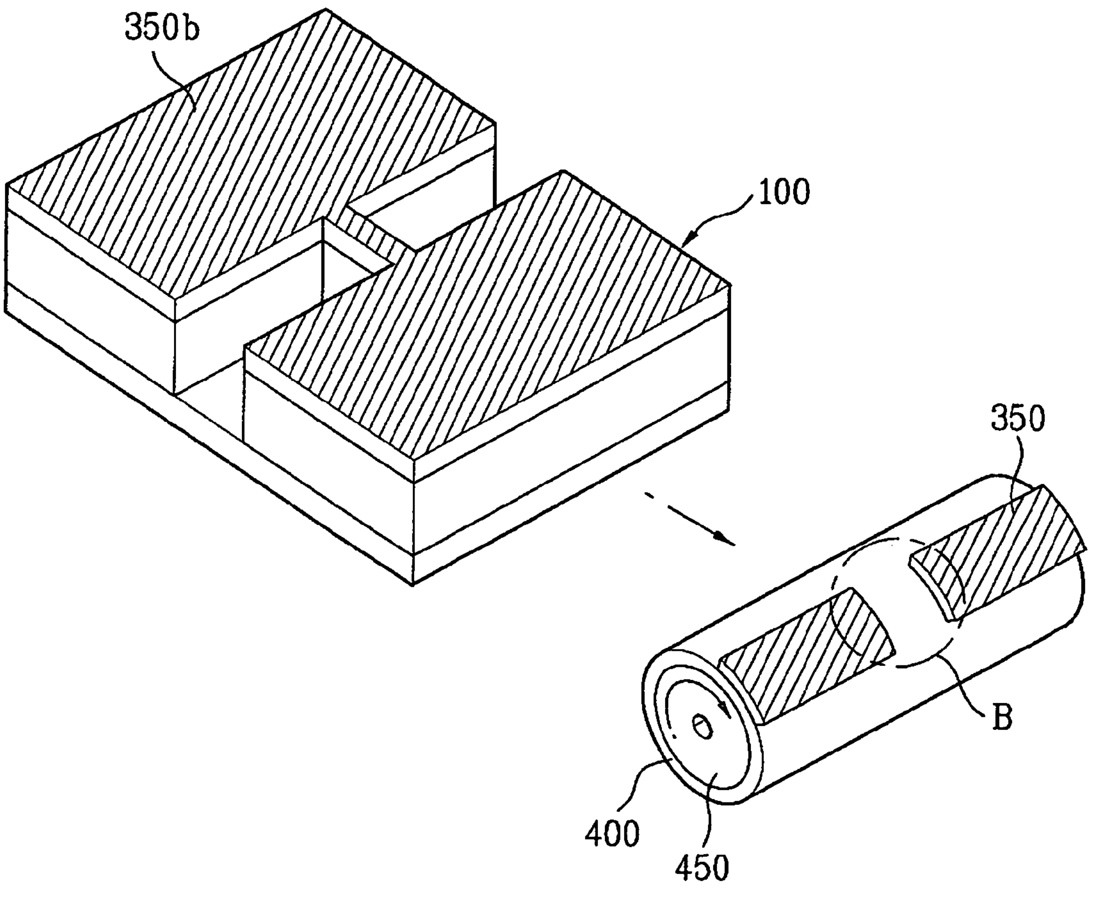

If the printing roll 400 coated with the color filter material 350 is rotated on the printing plate 100 as described above, some color filter material **350*b* is transferred onto the convex portion 120 and the blanket supports 160 as shown in FIG. 4D while the color filter material 350 of a predetermined pattern remains on the blanket 450 of the printing roll 400**.

Figure 4E:
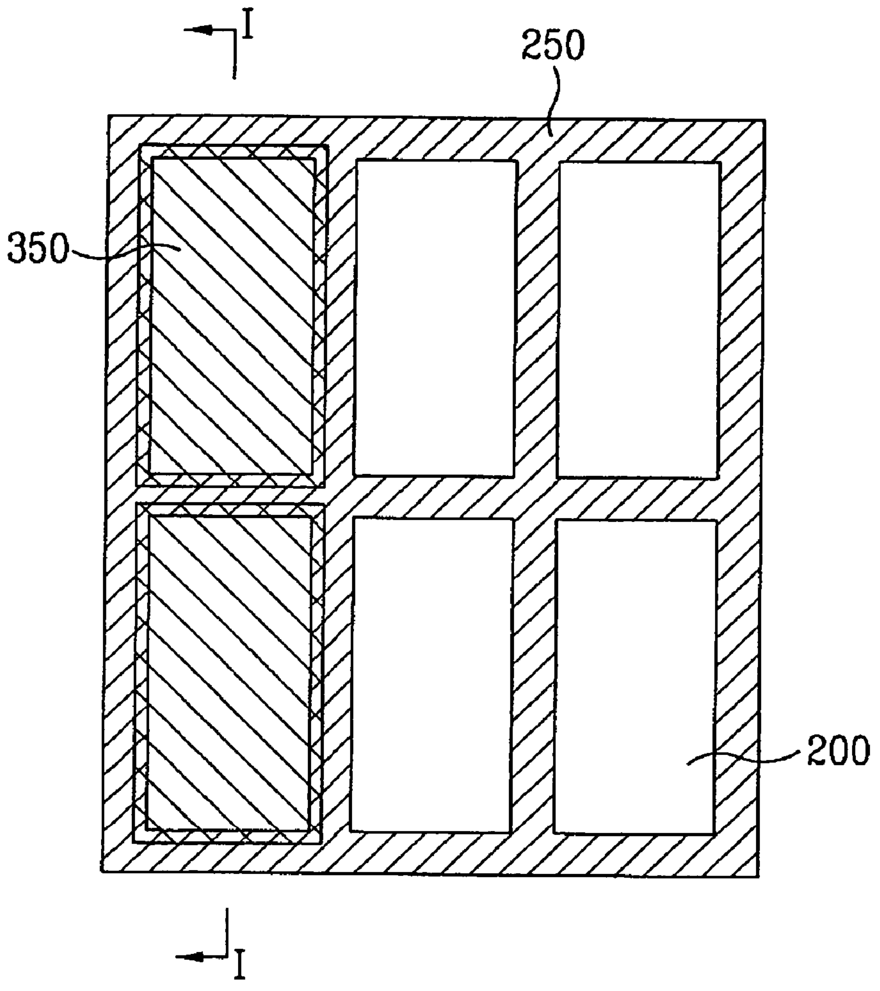
Figure 4E:
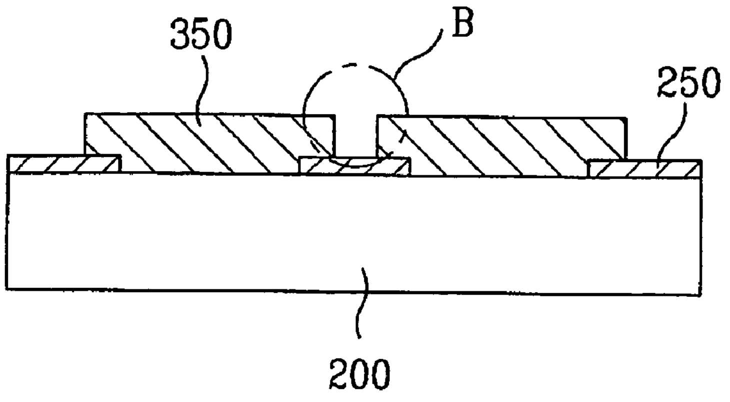

Afterwards, as shown in FIG. 4E, the printing roll 400 is rotated on the substrate provided with the light-shielding layer 250 so that the remaining color filter material 350 is transferred onto the substrate 200 to form the color filter layer 350.

An upper side of FIG. 4E is a plan view illustrating the light-shielding layer 250 and the color filter layer 350 formed on the substrate 200, and its lower side is a sectional view taken along line I-I of the upper side.

If the plurality of blanket support 160 of the printing plate 100 are formed at intervals corresponding to the distance between cells of the LCD device as shown in FIG. 4C, some color filter material is transferred onto the blanket supports 160 as shown in FIG. 4D so that a gap region (region B) is formed in the printing roll at the distance between cells. As apparent from FIG. 4E, the gap region corresponds to the region B where the light-shielding layer 250 is formed.

Even though the color filter layer is discontinuously formed, the discontinuous portion of the color filter layer corresponds to the region for the light-shielding layer between the cells, whereby images can be displayed without any problem.

As described above, the color filter layer having any one color of red, green and blue may be formed by the process steps of FIGS. 4A to 4E. Further, the color filter layer having a plurality of colors may be formed by repetition of the above process steps.

Although not shown, a common electrode or an overcoat layer may additionally be formed on the entire surface of the substrate after the color filter layer is completed.

Also, although not shown, the process step of preparing another opposing substrate opposite to the above substrate and the process step of interposing a liquid crystal layer between the two substrates are performed to complete the LCD device.

The opposing substrate is prepared by forming gate and data lines crossing each other to define a pixel region, forming a thin film transistor formed at a crossing portion of the gate and data lines, the thin film transistor including a gate electrode, a source electrode, and a drain electrode, and forming a pixel electrode connected with the drain electrode of the thin film transistor.

Meanwhile, in case of an in-plane switching (IPS) mode LCD device, the common electrode is formed in parallel with the pixel electrode so that the liquid crystal layer is driven by a transverse electric field between the pixel electrode and the common electrode.

The liquid crystal layer is interposed between the two substrates by a vacuum injection method or a liquid crystal dropping method.

The vacuum injection method is to inject a liquid crystal using the pressure difference under the vacuum state after bonding the substrates to each other in a state that an injection hole is formed between the substrates.

The liquid crystal dropping method is to bond the substrates to each other after dropping the liquid crystal onto any one of the substrates.

As the size of the substrate is increased, the liquid crystal dropping method is preferred because the vacuum injection method requires an increased liquid injection time, resulting in reduction of productivity.

As described above, the printing plate and the method of fabricating an LCD device using the same according to the present invention have the following advantages.

The blanket supports are additionally formed in the concave portion of the printing plate to prevent the pattern material coated on the blanket of the printing roll from being directly in contact with the bottom of the concave portion. In this case, the pattern material may be prevented from being transferred onto the printing plate in an undesired pattern. As a result, it is possible to form a precise pattern.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of fabricating an LCD device, comprising:
- preparing a printing plate having at least two convex portions, a concave portion between the at least two convex portions, and a blanket support within the concave portion to contact with a side between the at least two convex portions, to prevent a pattern material coated on a printing roll from being directly in contact with a bottom of the concave portion;
- coating a pattern material on a blanket of a printing roll using a printing nozzle;
- transferring some pattern material onto the convex portions and the blanket support by rotating the printing roll on the printing plate; and
- transferring a remaining pattern material onto a substrate by rotating the printing roll on the substrate, for forming a predetermined pattern on the substrate,
- wherein the blanket support is formed to be higher than a bottom of the concave portion and a height of the blanket support is lower than that of the convex portions.

2. The method as claimed in claim 1, wherein the pattern material is a color filter material, and the predetermined pattern formed on the substrate is a color filter layer.

3. The method as claimed in claim 1, wherein a plurality of the blanket supports are formed in the concave portion.

4. The method as claimed in claim 3, wherein the blanket supports are formed at intervals corresponding to the distance between cells of the LCD device.

5. A method of fabricating an LCD device, comprising:
- preparing a printing plate having at least two convex portions, a concave portion between the at least two convex portions, and a blanket support within the concave portion to contact with a side between the at least two convex portions, to prevent a pattern material coated on a printing roll from being directly in contact with a bottom of the concave portion;
- forming a light-shielding layer on a substrate;
- coating a color filter material on a blanket of a printing roll using a printing nozzle;
- transferring some color filter material onto the convex portions and the blanket support by rotating the printing roll on the printing plate; and
- transferring a remaining color filter material onto the substrate provided with the light-shielding layer by rotating the printing roll on the substrate, for forming a color filter layer on the substrate,
- wherein the blanket support is formed to be higher than a bottom of the concave portion and a height of the blanket support is lower than that of the convex portions.

6. The method as claimed in claim 5, wherein intervals of the blanket supports correspond to the distance between cells of the LCD device.

7. The method as claimed in claim 5, wherein the light-shielding layer corresponds to a gap region of the printing roll formed by transferring some color filter material onto the blanket support of the printing plate.

8. The method as claimed in claim 5, further comprising:

preparing an opposing substrate opposite to the substrate; and interposing a liquid crystal layer between the two substrates.

9. The method as claimed in claim 8, wherein the step of interposing the liquid crystal layer between the two substrates includes:

forming the liquid crystal layer by dropping a liquid crystal onto any one of the two substrates; and bonding the two substrates to each other.

* * * * *